United States Patent [19]
Makishima et al.

[11] 3,895,136
[45] July 15, 1975

[54] PROCESS FOR PREPARATION OF DECORATIVE ARTICLES HAVING PATTERNED COATING OF INORGANIC PAINT

[75] Inventors: Hiroshi Makishima, Yokohama; Toshio Shinohara, Fujisawa; Yukio Kawahara, Yokohama; Hiroshi Nii, Kamakura; Setsuo Ebine, Yokohama, all of Japan

[73] Assignee: Dai Nippon Toryo Co., Ltd., Osaka, Japan

[22] Filed: Dec. 28, 1973

[21] Appl. No.: 429,176

[30] Foreign Application Priority Data
Dec. 29, 1972 Japan............................ 48-3718

[52] U.S. Cl................................ 427/257; 427/261
[51] Int. Cl............................................. B44d 5/00
[58] Field of Search .......... 117/41, 45, 70 S, 119.6, 117/169 A

[56] References Cited
UNITED STATES PATENTS
1,818,729   8/1931   Marmorstein........................ 117/41
3,560,240   2/1971   Simmons.............................. 117/41
3,635,858   1/1972   Shiratori ........................... 260/22 R OTHER PUBLICATIONS
Hess, Paint Film Defects, Chapman and Hall, Ltd., London, 1965, FIGS. 5, 61 and 62.

Primary Examiner—Thomas J. Herbert, Jr.
Assistant Examiner—Bruce H. Hess
Attorney, Agent, or Firm—Haseltine, Lake & Waters

[57] ABSTRACT

A process for the preparation of decorative articles having a patterned coating of an inorganic paint, which comprises coating a solvent having a water solubility of at least 20% or a mixture of said solvent with an organic or inorganic binder or an inorganic filler on a substrate, allowing the coated substrate to stand, coating an inorganic paint of the silicate type on the coated surface of the substrate, and then drying and hardening the coating.

10 Claims, 4 Drawing Figures

3,895,136

PROCESS FOR PREPARATION OF DECORATIVE ARTICLES HAVING PATTERNED COATING OF INORGANIC PAINT

BACKGROUND OF THE INVENTION

1. Field of the Invention

This invention relates to a decorative article having a coating of an inorganic paint having a rugged pattern including cracks and to a process for the preparation of such decorative article. More particularly, the invention provides a simple process for coating a substrate such as a metal, wood or ceramic article with an incombustible film of an inorganic paint of the silicate type having a beautiful pattern.

2. Description of the Prior Art

Paints comprising as a vehicle an organic material such as a synthetic resin have heretofore been used as construction materials and the like broadly in various fields. In a fire, however, poisonous gases such as carbon monoxide, chlorine and hydrogen cyanide are generated from coating films of these paints and poisonous fumes are generated by the organic materials contained in the paints, causing many casualities. Accordingly, incombustibility is now required not only of construction materials and interior decoration materials but also paints.

Paints of water glass type, i.e., the alkali metal silicate series, have long been known as incombustible paints. For example, there are known paints including as a vehicle potassium silicate (U.S. Pat. Nos. 3,077,389, 3,389,002, 3,493,401 and 3,522,113), sodium silcate (U.S. Pat. No. 3,492,137) or lithium silicate (U.S. Pat. Nos. 3,356,515 and 3,392,039). As a silicate type composition free from an alkali metal silicate, there is known a composition comprising an organic ammonium silicate and incorporated therein, a binder such as boric acid and phosphoric acid (U.S. Pat. Nos. 3,248,237 and 3,345,192). As a paint composition having especially a fire-proofing or fire-preventive property, there are proposed a composition comprising as a binder sodium silicate (U.S. Pat. No. 2,991,200), a composition comprising sodium hexametaphosphate incorporated in said binder (U.S. Pat. No. 3,639,276), and a composition including a combination of an alkali metal silicate and an organic silicone (U.S. Pat. No. 3,493,401).

Further, as the special coating composition, there is known a composition comprising an alkali metal silicate and a curing agent composed of a water-alcohol solution of a chloride or sulfate of calcium, cobalt, magnesium or the like and nitric acid, sulfuric acid, fumaric acid or acetic acid (U.S. Pat. No. 3,258,345).

Still further, as a special coating process, there is known a process comprising coating an alkali metal silicate on an aluminum oxide film, and immersing the coated film into a solution containing a fluoride after complete hardening of the coating, thereby removing alkali metal ions (U.S. Pat. No. 3,625,737).

In each of the foregoing known conventional techniques, only a smooth finished surface is obtained by coating an inorganic paint on a substrate. Currently, however, in addition to smooth finished coatings, there are demanded decorative coatings having a variety of rugged patterns.

As in seen from the foregoing explanation of the prior art techniques, neither an inorganic paint coating having a patterned surface nor a process for the production of such coating has been known in the art, and hardly any research has been made in this field.

SUMMARY OF THE INVENTION

This invention is directed to a process for forming an inorganic paint coating having a patterned surface, according to which the above-mentioned defects and disadvantages of the prior art techniques can be overcome.

The objects of this invention are as follows:

1. To obtain a decorative article having an inorganic paint coating having a rugged pattern or a pattern of cracks or chaps.

2. To obtain a decorative article having a patterned inorganic paint coating which has a multi-colored finish in which the color of the pattern portion is different from the color of the smooth portion.

3. To obtain a decorative article having a patterned coating of an inorganic paint which exhibits good adhesion to a substrate.

4. To obtain an incombustible coating film.

More specifically, in accordance with the invention, there are provided (1) a process for the preparation of decorative articles having a patterned coating, which comprises coating on a substrate a water-soluble organic solvent, the solubility of which in water at 20°C is at least 20%, allowing the coated substrate to stand, coating an inorganic paint of the silicate type on the coated surface of the substrate, and drying and hardening the coating, and (2) a process for the preparation of decorative articles having a patterned coating, which comprises coating on a substrate a mixture of a water-soluble organic solvent, the solubility of which in water at 20°C is at least 20%, and an organic or inorganic binder or an inorganic filler, allowing the coated substrate to stand, coating an inorganic paint of the silicate type on the coated surface of the substrate, and drying and hardening the coating.

DETAILED DESCRIPTION OF THE INVENTION

Figure 1:
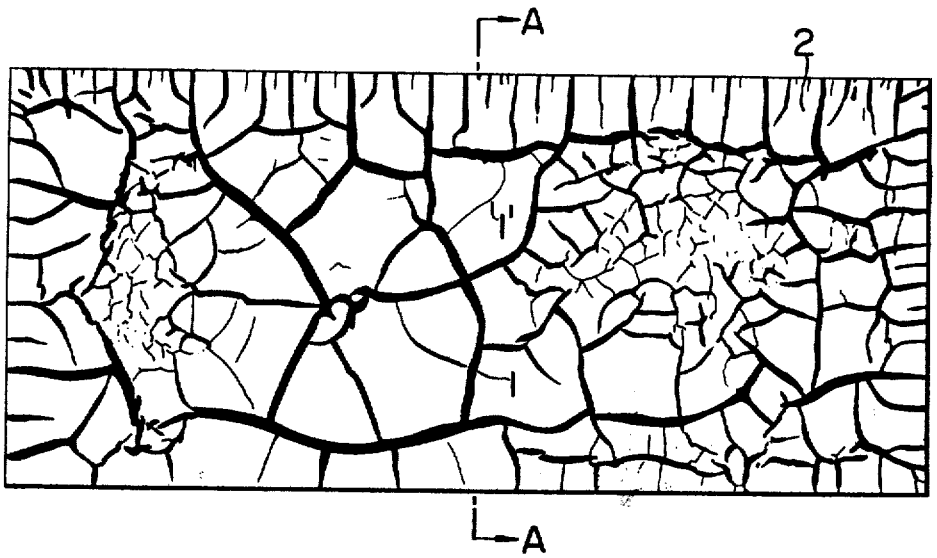
FIG. 1 is a front view of a decorative plate having on the entire coated surface thereof a rugged pattern including cracks, which is obtained by practicing the process of this invention.

Inorganic paints of the silicate type to be used in this invention include as a vehicle a silicate represented by the following general formula

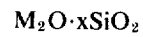

wherein $x$ is a number of from 0.5 to 10, and M is a member selected from the group consisting of (1) alkali metals belonging to Group IA of the Periodic Table, (2), mono-, di-, tri- and tetra-amines represented by the formula $R_4 — N —$ (R is H, $—CH_2OH$, $—C_2H_4OH$, $—CH_3$, $—C_2H_5$ or the like) and (3) groups represented by the formula -N=C(NH$_2$)$_2$ or 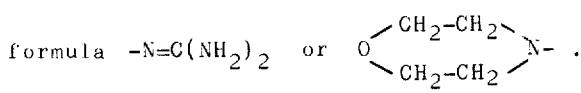

Specific examples of the silicate to be used in this invention are sodium silicate, potassium silicate, lithium silicate, ammonium silicate, morpholine silicate, guanidine silicate, and silicates of amines such as monomethanol amine, monoethanol amine, dimethanol amine, diethanol amine, trimethanol amine, triethanol amine, tetramethanol amine, tetraethanol amine, monomethyl amine, monoethyl amine, dimethyl amine, diethyl amine, trimethyl amine, triethyl amine, tetramethyl amine and tetraethyl amine. These silicates can be used singly, or mixtures of two or more of these silicates can also be employed.

Inorganic paints to be used in this invention are formed by adding suitable amounts of water and a hardening agent to a vehicle such as mentioned above and if necessary, further adding an organic or inorganic pigment, a dispersing agent or other additive.

Any of the hardening agents customarily used for silicate paints can be used in this invention. Examples of such hardening agents are powders of metals such as zinc, lead and aluminum, metal oxides such as magnesium oxide, zinc oxide, aluminum oxide, lead oxide, calcium oxide and chromium oxide, metal hydroxides such as magnesium hydroxide, zinc hydroxide, aluminum hydroxide and lead hydroxide, fluorides such as sodium fluoride and sodium silicofluoride, phosphates such as aluminum pyrophosphate and magnesium pyrophosphate, carbonates such as magnesium carbonate, sulfates such as magnesium sulfate, and carbon dioxide gas and the like.

These hardening agents can be used as they are or in the form of an aqueous solution or dispersion. These hardening agents can be used singly or in the form of a mixture of two or more of these hardening agents. They are applied in the form of a so-called one-liquid type paint composed of such hardening agent and a silicate such as mentioned above. It also is possible to use a so-called two-liquid type paint, namely mixing the hardening agent with the above-mentioned silicate in situ at the time of application. It is preferred that the hardening agent be used in an amount of 4 to 30% by weight based on the silicate. In a special embodiment of this invention, the above-mentioned silicate vehicle is coated on a substrate and then the vehicle is hardened in an atmosphere of carbon dioxide as the hardening agent.

Any organic and inorganic pigments that are used for ordinary coating compositions can be used in this invention, and in some cases, dyes can be used as colorants.

The "water-soluble organic solvent" to be used in this invention includes organic solvents which preferably have a solubility in water at 20°C of at least 20%. Examples of the water-soluble organic solvent are alcohol type solvents such as methyl alcohol, ethyl alcohol, isopropyl alcohol, n-propyl alcohol, sec-butyl alcohol and tert-butyl alcohol, ketone type solvents such as acetone, methylethylketone, methoxymethylpentanone and diacetone alcohol, ester and ether-ester type solvents such as methyl acetate, ethylene glycol monomethyl ether acetate, ethylene glycol monoethyl ether acetate, diethylene glycol monomethyl ether acetate, diethylene glycol monoethyl ether acetate and ethyl butyrate, and ether and ether-alcohol type solvents such as propylene glycol monomethyl ether, ethylene glycol monomethyl ether, ethylene glycol monoethyl ether, ethylene glycol mono-isopropyl ether, 3-methoxybutanol, ethylene glycol monobutyl ether, dipropylene glycol monomethyl ether, diethylene glycol diethyl ether, diethylene glycol monomethyl ether, diethylene glycol monoethyl ether, diethylene glycol monobutyl ether and dioxane. These organic solvents can be used singly, or mixtures of two or more of them can be used. Especially good results can be obtained when an alcohol type solvent is used singly or in combination with another solvent.

In this invention, it is possible to employ the water-soluble solvent in the state incorporated with at least one "water-insoluble of barely water-soluble solvent." The water-insoluble or barely water-soluble solvent includes solvents which are quite insoluble in water and solvents, the solubility of which in water at 20°C is lower than 20%. Examples of such solvents are hydrocarbon solvents such as xylol, toluol and mineral spirits, alcohol solvents such as n-butyl alcohol and n-hexyl alcohol, nitrated or chlorinated hydrocarbon solvents such as 2-nitropropane and trichloroethylene, and ketones such as methyl-iso-butylketone and cyclohexanone. In short, all organic solvents ordinarily used for coating compositions can be used in this invention. These solvents are used singly or in the form of a mixture of two or more of them. It is preferred that such water-insoluble or difficultly water-soluble solvent be used in an amount of up to 40% by weight based on the water-soluble organic solvent.

In this invention, if the water-soluble solvent doesn't have an appropriate solubility in water, since an inorganic paint of the silicate type to be coated thereon is water-soluble, and undesired repelling phenomenon occurs, and water in the silicate type inorganic solvent is not absorbed, with the result that it is difficult to obtain a patterned coating.

In this invention, the water-soluble solvent or a mixture of the water-soluble solvent with the water-insoluble or barely water-soluble solvent can be used in a state incorporated with at least one member selected from organic and inorganic binders and inorganic fillers (such solvent will hereinafter be referred to as "additive-incorporated solvent").

The "organic or inorganic binder" to be used in this invention is soluble or dispersible in an organic solvent and has a film-forming property. Examples of the organic binder are alkyd resins obtained by condensation of a polybasic acid, a polyhydric alcohol and a fatty acid, modified alkyd resins such as epoxy-modified, acrylic-modified, silicone-modified, phenol-modified and styrene-modified alkyd resins, acrylic or vinyl resins obtained by homopolymerization or copolymerization of ethylenically unsaturated monomers such as acrylic acid, methacrylic acid, methyl methacrylate, styrene, vinyl chloride and vinyl acetate, epoxy resins obtained by condensation of bis-phenol A with epichlorohydrin, polyurethane resins prepared from a polyol and a polyisocyanate, polyester resins prepared from a polybasic acid and a polyhydric alcohol, polyamide resins such a nylon, amino resins such as melamine resins and urea resins, and polyethylene resins, polystyrene resins, silicone resins, phenol resins and diallyl phthalate resins. Examples of the inorganic binder are ammonium silicate, cellosolve silicate, butyl silicate, butyl titanate and ethyl silicate. These binders can be used singly or in the form of a mixture of two or more of them.

It is preferred that the organic binder have an average molecular weight of 500 to 100,000, especially 1,000 to 50,000.

The binder is used in a dissolved or dispersed state in the water-soluble organic solvent or in admixture with the water-insoluble or barely water-soluble solvent. The binder is dissolved or dispersed in such an amount that the non-volatile component concentration is up to 70% by weight, preferably up to 50% by weight.

It is preferred that the organic or inorganic binder has such a property as will give a smooth surface when coated on a substrate. If the primer coating of the binder is smooth, when the silicate type paint coated on the primer coating is shrunk by dehydration, a beautiful pattern of cracks can easily be obtained.

As the "inorganic filler," there are preferably employed silicon oxide, kaolin, diatomaceous earth, calcium carbonate and precipitated barium sulfate. They can be used singly or in the form of a mixture of two or more of them. It is preferred that the filler has a porous structure or a high oil absorption. In general, the inorganic filler to be used in this invention has a particle size of about 0.1 to about 500$\mu$. It is preferred that the inorganic filler be incorporated in an amount of up to 40% by weight based on the water-soluble solvent.

According to the process of this invention, a water-soluble solvent such as mentioned above, a mixed solvent of such water-soluble solvent with a water-insoluble or barely water-soluble solvent, or an additive-incorporated solvent is coated on a substrate by customary coating procedures such as spray coating, roller coating, flow coater coating, brush coating, electrostatic coating and the like. The solvent may be coated on the entire surface of the substrate or on a part of the surface of the substrate.

As the substrate to be used in this invention, there can be mentioned, for example, slate plates, glass plates, metal plates (aluminum plate, iron plate, steel plate, etc.), wood, mortar, plywood, plastics and the like. A variety of decorative plates formed by coating in advance an appropriate sealer or primer, a silicate type inorganic paint such as mentioned above or a phosphate type inorganic paint can also be employed in this invention.

The above-mentioned silicate type inorganic paint can be directly coated after coating of the above-mentioned solvent or additive-incorporated solvent, but in some cases, better results can be obtained when the coating of the solvent or additive-incorporated solvent is allowed to stand for a while or is positively dried to evaporate a part of the solvent present in a large amount on the substrate and then the silicate type inorganic paint is coated. In other words, if a large amount of the solvent is left on the substrate, the silicate type inorganic paint coated thereon is sometimes repelled or peeled by the remaining solvent. However, it is not preferred that the solvent be completely evaporated prior to coating of the silicate type inorganic paint, because in such case the intended objects of this invention cannot be attained.

In case the water-soluble solvent or the mixed solvent alone is coated on a substrate, it is sufficient to allow the coating to stand or be subjected to positive drying only for a short time. In the case of the additive-incorporated solvent, it is preferable to prolong the time the coating is allowed to stand or be subjected to positive drying, the prolongation being longer for an inorganic filler than for an organic or inorganic binder. In general, the coating is allowed to stand for about 0.5 to about 90 minutes.

Then, the above-mentioned silicate type inorganic paint is coated on the substrate in an amount of 50 to 150 g/m$^2$ according to the customary coating procedures as mentioned above.

The thus coated silicate type inorganic paint is naturally dried or baked at 100° to 250°C for 10 to 60 minutes, whereby even the interior of the coated inorganic paint is hardened and a decorative article having a patterned coating can be obtained.

In this invention, violent gelation and hardening of the silicate type inorganic paint are caused by the water-absorbing activity of the preliminarily coated water-soluble solvent, and therefore, cracks and chaps are formed on the coating to form a rugged pattern on the coating. In short, according to this invention, a patterned coating can be obtained simply by positively forming cracks and chaps on the coating of an inorganic paint.

In this invention, if the above procedures are applied to a primer-coated substrate, it is possible to obtain a decorative article having a beautiful, multi-colored and patterned coating by making the color of the silicate type inorganic paint different from the color of the primer coating. In this case, cracks and chaps which do not reach the substrate or primer coating are also formed, which are effective for giving a soft appearance to the surface of the resulting decorative article.

In the patterned decorative article prepared according to this invention, the coating film of the inorganic paint is not easily peeled by abrasion or impact. This is one of the advantages of the decorative article obtained according to this invention.

Figure 2:
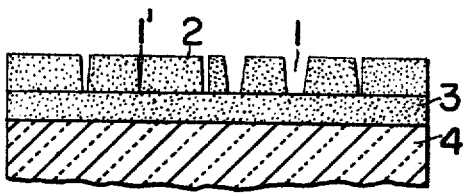
FIG. 2 is a sectional view taken along line A—A in FIG. 1.
Figure 3:
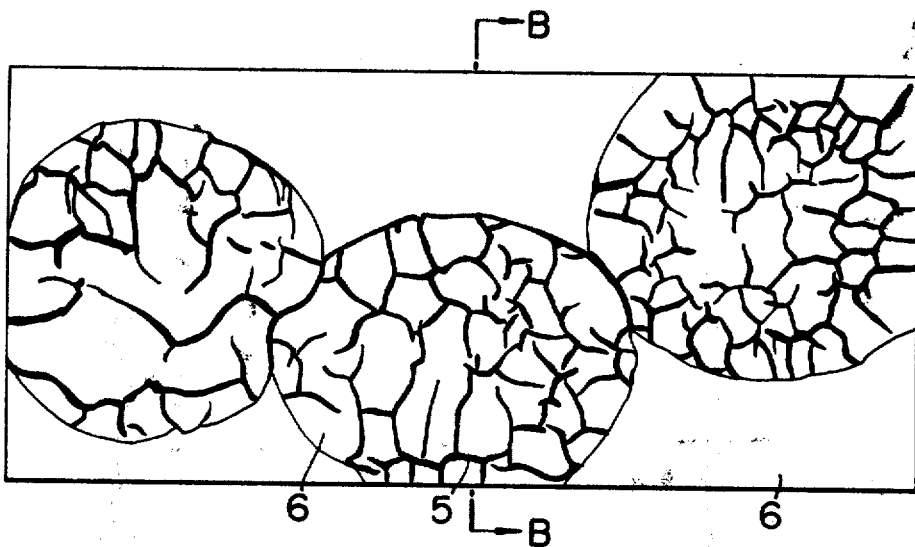
FIG. 3 is a front view of a decorative plate having a partially patterned coating, which is obtained by practicing the process of this invention.

The decorative article having an inorganic paint coating having a rugged pattern including cracks, which is obtained by practicing the process of this invention, for example, a decorative plate, has a surface appearance such as shown in FIGS. 1 and 3. Thus, the "pattern" referred to in the instant specification and claims includes patterns ranging from a pattern of fine chaps such as represented by 1' in FIG. 2 to a pattern of branched cracks such as represented by 1 in FIG. 1.

This invention will now be illustrated in more detail by reference to the following Examples, in which "parts" and "%" are on a weight basis unless otherwise indicated.

Example 1

A mixture of the following formulation 1 was coated on a glass sheet by means of a brush and dried in air for about 1 hour.

| Formulation 1 | |
|---|---|
| nylon resin | 40 parts |
| methanol | 60 parts |
| total | 100 parts |

Then, an inorganic paint of the following inorganic paint formulation 1 was spray-coated on the above coating, and the inorganic paint coating was dried and hardened at room temperature.

| Inorganic Paint Formulation 1 | |
| --- | --- |
| aqueous solution of potassium silicate (non-volatile content = 25.3% by weight) | 50 parts |
| aqueous solution of sodium silicate (non-volatile content = 37.6% by weight) | 17 parts |
| diatomaceous earth | 5 parts |
| kaolin clay | 8 parts |
| titanium white | 15 parts |
| magnesium carbonate | 5 parts |
| total | 100 parts |

There was obtained a decorative article having a coating of a beautiful pattern of cracks. The inorganic paint coating with such pattern of cracks had good adhesion to the glass sheet substrate.

Example 2

A mixture of the following formulation 2 was spray-coated on a steel plate and positively dried at 50°C for 5 minutes.

| Formulation 2 | |
| --- | --- |
| acrylic resin | 40 parts |
| ethylene glycol monobutyl ether | 60 parts |
| total | 100 parts |

Then, an inorganic paint of the inorganic paint formulation 1 shown in Example 1 was spray-coated on the above coating, and baked and hardened at 180°C for 30 minutes to obtain a decorative article having a beautiful patterned coating.

Example 3

A mixture of the following formulation 3 was flow-coated on a slate plate and dried in air for about 1 hour.

| Formulation 3 | |
| --- | --- |
| alkyd resin | 40 parts |
| acetone | 20 parts |
| methanol | 40 parts |
| total | 100 parts |

Then, an inorganic paint of the inorganic paint formulation 1 shown in Example 1 was spray-coated on the above coating, and the inorganic paint was dried at room temperature to obtain a decorative article having a beautiful patterned coating.

Example 4

A mixture of the following formulation 4 was roll-coated on a glass sheet and positively dried at about 80°C for 10 minutes.

| Formulation 4 | |
| --- | --- |
| vinyl resin | 30 parts |
| ethylene glycol monomethyl ether | 10 parts |
| xylol | 10 parts |
| methanol | 25 parts |
| sec-butanol | 25 parts |
| total | 100 parts |

Then, an inorganic paint of the inorganic paint formulation 1 shown in Example 1 was spray-coated on the above coating and baked and hardened at 180°C for 30 minutes to obtain a decorative article having a patterned coating.

Example 5

A mixture of the following formulation 5 was coated on a slate plate by means of a brush and dried in air for about 1 hour.

| Formulation 5 | |
| --- | --- |
| nylon resin | 25 parts |
| methanol | 45 parts |
| ethanol | 20 parts |
| sec-butanol | 10 parts |
| total | 100 parts |

Then, an inorganic paint of the inorganic paint formulation 1 shown in Example 1 was spray-coated on the above coating and positively dried at 80°C for 10 minutes to obtain a decorative article having a patterned coating.

Example 6

An inorganic paint of the inorganic paint formulation 1 shown in Example 1 was spray-coated on a slate plate and baked at 180°C for 30 minutes to obtain a completely hardened coating. Then, a mixture of the formulation 1 shown in Example 1 was coated on the thus primer-coated substrate by means of a brush and dried in air for about 1 hour. Then, an inorganic paint of the following inorganic paint formulation 2 was spray-coated on the above coating and dried at room temperature.

| Inorganic Paint Formulation 2 | |
| --- | --- |
| aqueous solution of potassium silicate (non-volatile content = 27.3% by weight) | 50 parts |
| aqueous solution of sodium silicate (non-volatile content = 37.6% by weight) | 17 parts |
| diatomaceous earth | 5 parts |
| kaolin clay | 8 parts |
| red iron oxide | 15 parts |
| magnesium carbonate | 5 parts |
| total | 100 parts |

There was obtained a decorative article having a coating of a beautiful pattern in which portions of cracks were white and other portions were red.

The thus obtained decorative article having a patterned coating is shown in FIGS. 1 and 2. In FIG. 1, reference numeral 1 indicates the white portions of the cracks and reference numeral 2 indicates the smooth portions colored red. In FIG. 2, reference numeral 3 indicates a white inorganic primer coating and reference numeral 4 indicates a slate plate as the substrate.

Example 7

An inorganic paint of the inorganic paint formulation 2 shown in Example 6 was spray-coated on an iron plate and baked at 180°C for 30 minutes to obtain a completely hardened primer coating. A mixture of the formulation 2 shown in Example 2 was roll-coated on the thus obtained primer coating and positively dried at 60°C for 5 minutes. Then, an inorganic paint of the inorganic paint formulation 1 shown in Example 1 was spray-coated thus the so formed coating and baked at 150°C for 30 minutes to obtain a decorative article having a patterned coating.

Example 8

An inorganic paint of the inorganic paint formulation 2 shown in Example 6 was spray-coated on a slate plate and baked at 180°C for 30 minutes to obtain a completely hardened inorganic paint primer coating. Then, a mixture of the formulation 3 shown in Example 3 was flow-coated on the thus obtained primer coating and dried in air for about 1 hour. Then, an inorganic paint of the inorganic paint formulation 1 shown in Example 1 was spray-coated on the thus formed coating and dried at room temperature to obtain a decorative article having a patterned coating.

Example 9

An inorganic paint of the inorganic paint formulation 2 shown in Example 6 was spray-coated on a glass sheet and baked at 180°C. for 30 minutes to obtain a completely hardened primer coating. Then, a mixture of the formulation 4 shown in Example 4 was spray-coated on the primer coating and positively dried at 80°C for 10 minutes. Then, an inorganic paint of the inorganic paint formulation 1 shown in Example 1 was spray-coated on the thus formed coating and baked at 180°C for 30 minutes to obtain a decorative article having a coating of a beautiful pattern of cracks in which portions of cracks were colored red and other portions were white.

Example 10

An inorganic paint of the inorganic paint formulation 2 shown in Example 6 was spray-coated on a slate plate and baked at 180°C for 30 minutes to obtain a completely hardened primer coating. Then, a mixture of the formulation 5 shown in Example 5 was coated on the thus formed primer coating by means of a brush and dried in air for about 1 hour. Then, an inorganic paint of the inorganic paint formulation 1 shown in Example 1 was spray-coated on the thus obtained coating and dried at room temperature to obtain a decorative article having a patterned coating.

Example 11

A mixture of the following formulation 6 was spray-coated on a slate plate and allowed to stand at room temperature for a while.

| Formulation 6 | |
|---|---|
| methanol | 25 parts |
| ethanol | 30 parts |
| acetone | 10 parts |
| sec-butanol | 35 parts |
| total | 100 parts |

Then, an inorganic paint of the inorganic paint formulation 1 shown in Example 1 was spray-coated on the above coating and dried at room temperature to obtain a decorative article having a patterned coating.

Example 12

A mixture of the following formulation 7 was spray-coated on a glass sheet and allowed to stand in air for a while.

| Formulation 7 | |
|---|---|
| methanol | 25 parts |
| ethylene glycol monoethyl ether | 10 parts |
| butanol | 30 parts |
| ethanol | 15 parts |
| SiO$_2$ | 20 parts |
| total | 100 parts |

Then, an inorganic paint of the inorganic paint formulation 1 shown in Example 1 was spray-coated on the above coating and baked at 180°C for 30 minutes to obtain a decorative article having a patterned coating.

Example 13

A mixture of the following formulation 8 was coated on a wood board by means of a roll coater and dried in air for about 1 hour.

| Formulation 8 | |
|---|---|
| silicone resin | 40 parts |
| xylol | 10 parts |
| toluol | 10 parts |
| methanol | 40 parts |
| total | 100 parts |

Then, an inorganic paint of the inorganic paint formulation 1 shown in Example 1 was spray-coated on the above coating and dried at room temperature to obtain a decorative wood article having a patterned coating.

Example 14

An inorganic paint of the following inorganic paint formulation 3 was spray-coated on an aluminum substrate and baked at 180°C for 30 minutes to obtain a completely hardened primer coating.

| Inorganic Paint Formulation 3 | |
|---|---|
| aqueous solution of potassium silicate (non-volatile content = 25% by weight) | 20 parts |
| aqueous solution of sodium silicate (non-volatile content = 40% by weight) | 30 parts |
| diatomaceous earth | 3 parts |
| talc | 4 parts |
| titanium yellow | 10 parts |
| calcium fluoride | 5 parts |
| total | 100 parts |

Then, a mixture of the following formulation 9 was spray-coated on the so obtained primer coating and positively dried at 80°C for 10 minutes.

| Formulation 9 | |
|---|---|
| acrylic resin | 30 parts |
| acetone | 20 parts |
| methylethylketone | 20 parts |
| ethanol | 30 parts |
| total | 100 parts |

Then, an inorganic paint of the organic paint formulation 1 shown in Example 1 was spray-coated on the above coating and baked at 150°C for 30 minutes to obtain a decorative article having a patterned coating.

Example 15

An inorganic paint of the inorganic paint formulation 2 shown in Example 6 was spray-coated on a slate plate and baked at 180°C for 30 minutes to obtain a completely hardened primer coating. Then, a mixture of the following formulation 10 was coated on the thus obtained primer coating by means of a brush and dried in air for about 1 hour.

| Formulation 10 | |
|---|---|
| urea-melamine resin | 40 parts |
| butanol | 20 parts |
| methanol | 40 parts |
| total | 100 parts |

Then, an inorganic paint of the inorganic paint formulation 3 shown in Example 14 was spray-coated on the above coating and baked and hardened at 150°C for 30 minutes to obtain a decorative slate article having a patterned coating.

Example 16

A mixture of the following formulation 11 was coated on a glass sheet by means of a flow coater and positively dried at 50°C for 5 minutes.

| Formulation 11 | |
|---|---|
| styrol resin | 40 parts |
| xylol | 10 parts |
| ethanol | 25 parts |
| methanol | 25 parts |
| total | 100 parts |

Then, an inorganic paint of the inorganic paint formulation 3 shown in Example 14 was spray-coated on the above coating and dried at room temperature to obtain a decorative article having a patterned coating.

Example 17

A mixture of the following formulation 12 was coated on a part of a slate plate by means of a brush and allowed to stand at room temperature for 1 hour.

| Formulation 12 | |
|---|---|
| isopropanol | 20 parts |
| acetone | 20 parts |
| methanol | 30 parts |
| kaolin | 30 parts |
| total | 100 parts |

Then, an inorganic paint of the following inorganic paint formulation 4 was spray-coated on the partially coated slate plate and dried at room temperature.

| Inorganic Paint Formulation 4 | |
|---|---|
| aqueous solution of potassium silicate (non-volatile content = 25% by weight) | 34 parts |
| aqueous solution of sodium silicate (non-volatile content = 40% by weight) | 30 parts |
| aqueous solution of ammonium silicate (non-volatile content = 40% by weight) | 10 parts |
| kaolin | 6 parts |
| talc | 5 parts |
| iron oxide | 10 parts |
| zinc flower | 5 parts |
| total | 100 parts |

Figure 4:
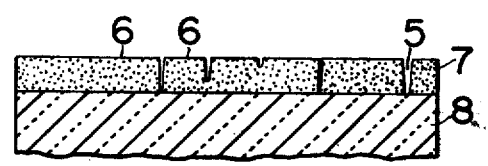
FIG. 4 is a sectional view taken along line B—B in FIG. 3.

The resulting decorative article had a coating partially patterned with cracks, which is shown in FIG. 3 and 4. In FIG. 3, reference numeral 5 indicates portions of cracks and reference numeral 6 indicates smooth portions. In FIG. 4, reference numeral 7 indicates a coating of the inorganic paint and reference numeral 8 indicates a slate plate as the substrate.

Example 18

An inorganic paint of the inorganic paint formulation 3 shown in Example 14 was spray-coated on a steel plate and baked at 180°C for 30 minutes to obtain a completely hardened primer coating. Then, a mixture of the following formulation 13 was coated on the thus obtained primer coating by means of a brush and allowed to stand at room temperature for 1 hour.

| Formulation 13 | |
|---|---|
| ethanol solution of ethyl silicate (non-volatile content = 40% by weight) | 30 parts |
| ethanol | 30 parts |
| methanol | 37 parts |
| magnesium chloride | 3 parts |
| total | 100 parts |

Then, an inorganic paint of the inorganic paint formulation 4 shown in Example 17 was spray-coated on the above coating and baked at 180°C for 30 minutes to obtain a decorative article having a patterned coating.

What we claim is:

1. A process for the preparation of decorative articles having an inorganic paint coating with a rugged pattern including cracks, said process comprising coating on a substrate a water-soluble organic solvent, the solubility of which in water at 20°C is at least 20%, allowing the coated substrate to stand for from 0.5 to 90 minutes, coating on the now coated substrate an inorganic paint comprising (i) is silicate having the formula

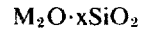

wherein $x$ is a number of from 0.5 to 10, and M is a member selected from the group consisting of (1) alkali metals belonging to Group IA of the Periodic Table, (2), mono-, di-, tri- and tetra-amines represented by the formula $R_4$—N— (R is H, —$CH_2OH$, —$C_2H_4OH$, —$CH_3$, —$C_2H_5$ or the like) and (3) groups represented by the formula —N=C($NH_2$)$_2$ or

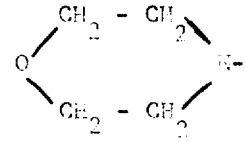

ii. a hardening agent in an amount of 4 to 30% by weight based on the silicate,
iii. water, and
iv. a pigment, the inorganic paint being applied in an amount of 50 to 150 g/m² prior to complete evaporation of said solvent on the substrate, and drying and hardening the coated paint.

2. A process according to claim 1 wherein the substrate has a primer coating composed of a completely hardened inorganic paint.

3. A process according to claim 1 wherein the water-soluble organic solvent is at least one alcohol type solvent.

4. A process according to claim 1 wherein the water-soluble organic solvent is a mixture of at least one alcohol type solvent and another solvent which is at least one member selected from the group consisting of ketones, esters, ether-esters, ethers, and ether-alcohol type solvents.

5. A process according to claim 1 comprising incorporating a water-insoluble or slightly water-soluble organic solvent, the solubility of which in water at 20°C is less than 20%, in the water-soluble organic solvent in an amount of up to 40% by weight based on the water-soluble organic solvent.

6. A process for the preparation of decorative articles having an inorganic paint coating with a rugged pattern including cracks, said process comprising coating on a substrate a mixture of water-soluble organic solvent, the solubility of which in water at 20°C is at least 20%, and an organic binder having an average molecular weight of between 500 and 100,000 or an inorganic binder, the binder being soluble or dispersible in the organic solvent, and having a film-forming property and being present in the amount such that the nonvolatile component concentration is up to 70% by weight, allowing the coated substrate to stand for from 0.5 to 90 minutes, coating on the thus coated substrate an inorganic paint comprising (i) a silicate representing the following general formula $$M_2O \cdot xSiO_2$$

wherein $x$ is a number of from 0.5 to 10, and M is a member selected from the group consisting of (1) alkali metals belonging to Group IA of the Periodic Table, (2), mono-, di-, tri- and tetra-amines represented by the formula $R_4—N—$ (R is H, $—CH_2OH$, $—C_2H_4OH$, $—CH_3$, $—C_2H_5$ or the like) and (3) groups represented by the formula $—N=C(NH_2)_2$ or

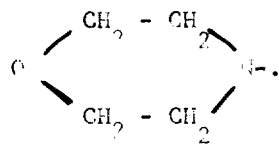

ii. a hardening agent in an amount of 4 to 30% by weight based on the silicate,
iii. water, and
iv. a pigment, the inorganic paint coating being present in an amount of 50 to 150 g/m² and being applied prior to complete evaporation of said solvent, and drying and hardening the coated paint.

7. A process according to claim 6 comprising incorporating a water-insoluble or barely water-soluble organic solvent, the solubility of which in water at 20°C is less than 20%, into the water-soluble organic solvent in an amount of up to 40% by weight based on the water-soluble organic solvent.

8. A process according to claim 6 wherein the organic or inorganic binder is dissolved or dispersed in a mixed solvent of the water-soluble organic solvent and the water-insoluble or barely water-soluble organic solvent, the solubility of which in water at 20°C is less than 20%, in an amount of up to 70% by weight based on the mixed solvent.

9. A process for the preparation of decorative articles having an inorganic paint coating with a rugged pattern including cracks, said process comprising coating on a substrate a mixture of a water-soluble organic solvent, the solubility of which in water at 20°C is at least 20%, and an inorganic filler having a particle size of about 0.1 to about 500μ which is selected from the group consisting of silicon oxide, kaolin, diatomaceous earth, calcium carbonate and precipitated barium sulfate, in an amount of up to 40% by weight based on the water-soluble solvent, allowing the coated substrate to stand for from 0.5 to 90 minutes, coating on the thus coated substrate an inorganic paint comprising (i) a silicate having the formula $$M_2O \cdot xSiO_2$$

wherein $x$ is a number of from 0.5 to 10, and M is a member selected from the group consisting of (1) alkali metals belonging to Group IA of the Periodic Table, (2) mono-, di-, tri-, and tetraamines represented by the formula $R_4—N—$ (R is H, $—CH_2OH$, $—C_2H_4OH$, $—CH_3$, $—C_2H_5$ or the like) and (3) groups represented by the formula $—N=C(NH_2)_2$ or

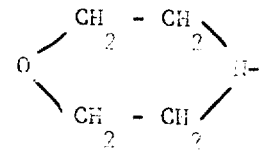

ii. a hardening agent in an amount of 4 to 30% by weight based on the silicate,
iii. water, and
iv. a pigment,
the inorganic paint being applied in an amount of 50 to 150 g/m² prior to complete evaporation of said solvent, and drying and hardening the coated paint.

10. A process according to claim 9 comprising incorporating a water-insoluble or barely water-soluble organic solvent, the solubility of which in water at 20°C is less than 20%, in said water-soluble organic solvent in an amount of up to 40% by weight based on the water-soluble organic solvent.

* * * * *